United States Patent
Weldon

(10) Patent No.: US 10,240,711 B2
(45) Date of Patent: Mar. 26, 2019

(54) SECURITY SUPPORT STAND FOR MOUNTED TABLET TYPE COMPUTER

(71) Applicant: Inducomp Corporation, Pacific, MO (US)

(72) Inventor: John T. Weldon, Pacific, MO (US)

(73) Assignee: INDUCOMP Corporation, Pacific, MO (US)

( * ) Notice: Subject to any disclaimer, the term of this patent is extended or adjusted under 35 U.S.C. 154(b) by 0 days.

(21) Appl. No.: 15/709,217

(22) Filed: Sep. 19, 2017

(65) Prior Publication Data

US 2018/0080597 A1   Mar. 22, 2018

Related U.S. Application Data

(60) Provisional application No. 62/396,629, filed on Sep. 19, 2016.

(51) Int. Cl.
| | |
|---|---|
| *F16M 11/00* | (2006.01) |
| *F16M 11/14* | (2006.01) |
| *F16M 13/02* | (2006.01) |
| *G06F 1/16* | (2006.01) |

(52) U.S. Cl.
CPC .......... *F16M 11/14* (2013.01); *F16M 13/02* (2013.01); *G06F 1/1615* (2013.01); *G06F 1/1626* (2013.01); *G06F 1/1632* (2013.01); *F16M 2200/021* (2013.01)

(58) Field of Classification Search
CPC ............. Y10S 248/917; Y10S 248/919; Y10S 248/923; Y10S 248/92; Y10S 248/922; F16M 11/046; F16M 11/10; F16M 11/2014; A47B 97/00; A47B 2097/003; A47B 2097/005

USPC ....... 248/917, 918, 919, 920, 921, 922, 371, 248/398

See application file for complete search history.

(56) References Cited

U.S. PATENT DOCUMENTS

| | | | | |
|---|---|---|---|---|
| 8,035,957 | B2* | 10/2011 | Jung | F16M 11/105 248/917 |
| 9,822,921 | B2* | 11/2017 | Chen | F16M 11/041 |
| 2004/0011938 | A1* | 1/2004 | Oddsen, Jr. | F16M 11/10 248/393 |
| 2005/0121578 | A1* | 6/2005 | Asamarai | F16C 11/10 248/284.1 |

(Continued)

*Primary Examiner* — Steven M Marsh
(74) *Attorney, Agent, or Firm* — Stinson Leonard Street LLP

(57) ABSTRACT

A secure adjustable mounting system for a tablet computer system in a desired position includes a mount to connect the mounting system to the tablet computer system. A head and post permit articulating movement of the tablet computer. The mount, head, and post collectively may define a passage extending through the mount, head, and post between opposite ends of the passage. The passage is substantially inaccessible from outside the mounting system. In other instances, the mounting system has a first configuration in which the freedom to move the mount relative to the post is limited by a first selectively engageable motion limiter, and a second configuration in which the freedom to move the mount relative to the post is limited by a second selectively engageable motion limiter. The mounting system is further configured so the first and second selectively engageable motion limiters are not accessible from outside the mounting system.

20 Claims, 16 Drawing Sheets

(56) References Cited

U.S. PATENT DOCUMENTS

2007/0064380 A1\* 3/2007 Shin .................... F16M 11/105
 361/679.07
2016/0224065 A1 8/2016 Weldon \* cited by examiner

SECURITY SUPPORT STAND FOR MOUNTED TABLET TYPE COMPUTER

CROSS-REFERENCE TO RELATED APPLICATION

This application is a continuation of U.S. Ser. No. 62/396,629, filed Sep. 19, 2016, the entire contents of which are incorporated herein by reference.

FIELD OF INVENTION

The present invention relates generally to tablet computers, and more particularly to systems and methods for supporting tablet-type computers.

BACKGROUND

Tablet computers have become a very popular type of computing device. A typical tablet computer is a mobile device that has a generally flat, rectangular shape and a prominent touchscreen display (typically 7 inches or larger) that is a primary input/output device. Traditional keyboards are generally not used in a tablet computer. Instead tablet computers usually feature an on-screen pop up virtual keyboard that is sometimes used for typing. A stylus or finger is usually the most common mode of providing input to a tablet computer. Although an off-the-shelf tablet computer can have various different features, tablet computers typically come equipped with sensors for detecting motion and orientation, a camera, a speaker, and a microphone. Some examples of tablet computers include the Samsung Galaxy, Lenovo Yoga, Nvidia Shield, Google Nexus, Sony Xperia, Apple iPad, Toshiba Excite, Acer Iconia, Amazon Kindle, Barnes & Noble Nook, and many others. Tablet computers are very popular with consumers for activities such as Internet browsing, reading and sending emails, reading books, magazines, and other publications, playing games, taking, viewing, and editing pictures, and recording and watching videos. Many tablet computers are purchased and used primarily for personal recreation and entertainment.

However, as computing capabilities have increased, tablet computers have become more powerful and now have the processing capacity to perform many functions that have been traditionally conducted on more bulky and less portable computing devices, such as PCs. Nevertheless, the potential for expanded use of tablet computers in business and industry remains largely untapped. One system that has recently become available to help facilitate the use of tablet computers in a wide array of business settings is set forth in commonly-owned U.S. patent application Ser. No. 15/015,515, file Feb. 4, 2016, entitled "TABLET COMPUTER SYSTEM," inventor John T. Weldon, the entire contents of which are hereby incorporated by reference. This patent application discloses systems and methods of expanding the abilities of a tablet computer by facilitating multiple interchangeable connections of the tablet computer to various peripheral devices, such as bar code readers, magnetic strip readers, RF ID readers, fingerprint readers, scanners, and other similar devices that can facilitate use of the tablet computer in business applications, such as retail and restaurant point-of-sale (POS) systems, kiosks, inventory and price check kiosks, online catalogs, reward program management, gift card management, digital signage, advertising and other promotional activities, time and attendance terminal, patient information kiosks, patient identification checks, digital medical charts, etc. Moreover, the application discloses systems and methods for securely enclosing the tablet computer and peripherals in a way that limits unauthorized access to the tablet computer and peripheral devices, while at the same time making it easy for authorized personnel to access the tablet computer and/or peripheral devices and change the peripheral devices if desired. A system as described in the '515 patent application is commercially available under the tradename Tablet Armor from Inducomp Corp. of Pacific, Mo.

The system disclosed in the '515 patent has the option to include a formation on the back of the enclosure to facilitate mounting the system on various stands. Including fixed floor and counter stands, wall mounts, flexible adjustable stands, and swivel head stands. However, the options are limited to stands that are either non-adjustable fixed stands or adjustable stands that anyone, including customers and other personnel that are not authorized to access the tablet computer or the peripherals, can adjust without authorization or even supervision. This presents several problems. One problem is that the business and its authorized personnel do not really have the ability to control how the stand is adjusted. This can be desirable to create a uniform interface that is suitable for the particular location. It can also be desirable to prevent mischievous individuals from purposefully adjusting the stand to a position that is not at all suitable for that particular location for fun. More seriously, it may be possible in some cases for people who are not authorized to access the tablet computer or its peripheral to use the ability to adjust the stand to gain access to wiring that may run from the tablet computer through the stand to other computers of the business. The ability to access this wiring may allow criminals to steal identities, hack into computer systems, and conduct other criminal actions.

The present inventor has developed systems and methods described below that can be used to adjustably mount a tablet computer system in business environments in a manner that allows the business owner and other authorized people to adjust the stand in various different ways while limiting the ability of unauthorized people to adjust the stand.

SUMMARY

In one aspect of the present invention, a secure adjustable mounting system for adjustably holding a tablet computer system in a desired position generally comprises a mount for connecting the mounting system to the tablet computer system. A head supports the mount for articulating movement of the mount relative to the head, and a post supports the head for articulating movement of the head relative to the post. The mount, head, and post collectively define a passage extending through the mount, head, and post between opposite ends of the passage for connecting the tablet computer system to another system via a wiring extending through the passage. The mounting system is configured so the passage is substantially inaccessible from outside the mounting system except at the ends of the passage. The mounting system has a plurality of different configurations including first and second configurations. The first configuration is a configuration in which the freedom to move the mount relative to the post is limited by a first selectively engageable motion limiter. The second configuration is a configuration in which the freedom to move the mount relative to the post is limited by a second selectively engageable motion limiter different from the first motion limiter. The mounting system is further configured so the first and second selectively engageable motion limiters are not accessible from outside the mounting system.

In another aspect of the present invention, a secure adjustable mounting system for adjustably holding a tablet computer system in a desired position generally comprises a mount for connecting the mounting system to the tablet computer system. A head supports the mount for articulating movement of the mount relative to the head, and a post supports the head for articulating movement of the head relative to the post. The mount, head, and post collectively define a passage extending through the mount, head, and post between opposite ends of the passage for connecting the tablet computer system to another system via a wiring extending through the passage. The mounting system is configured so the passage is substantially inaccessible from outside the mounting system except at the ends of the passage. The mount is configured so that an end of the passage adjacent the mount is substantially inaccessible when the mount is connected to a tablet computer.

In still another aspect of the present invention, an adjustable mounting system for holding a tablet computer generally comprises a mount for connecting the mounting system to the tablet computer. A head supports the mount for rotational movement of the head relative to the mount, and a post supports the head for pivoting movement of the head relative to the post. A wire in a passage extends through the mount, head, and post. The head and post are connected to one another by a modified ball and socket formation in which a first partial ball formation is on the head and a second partial ball formation is on the post. The first and second partial ball formations being positioned is side-by-side relation to one another.

Other objects and features of the present invention will be in part apparent and in part pointed out hereinafter.

BRIEF DESCRIPTION OF THE DRAWINGS

Corresponding reference numbers indicate corresponding parts throughout the drawings.

DETAILED DESCRIPTION

Figure 1:
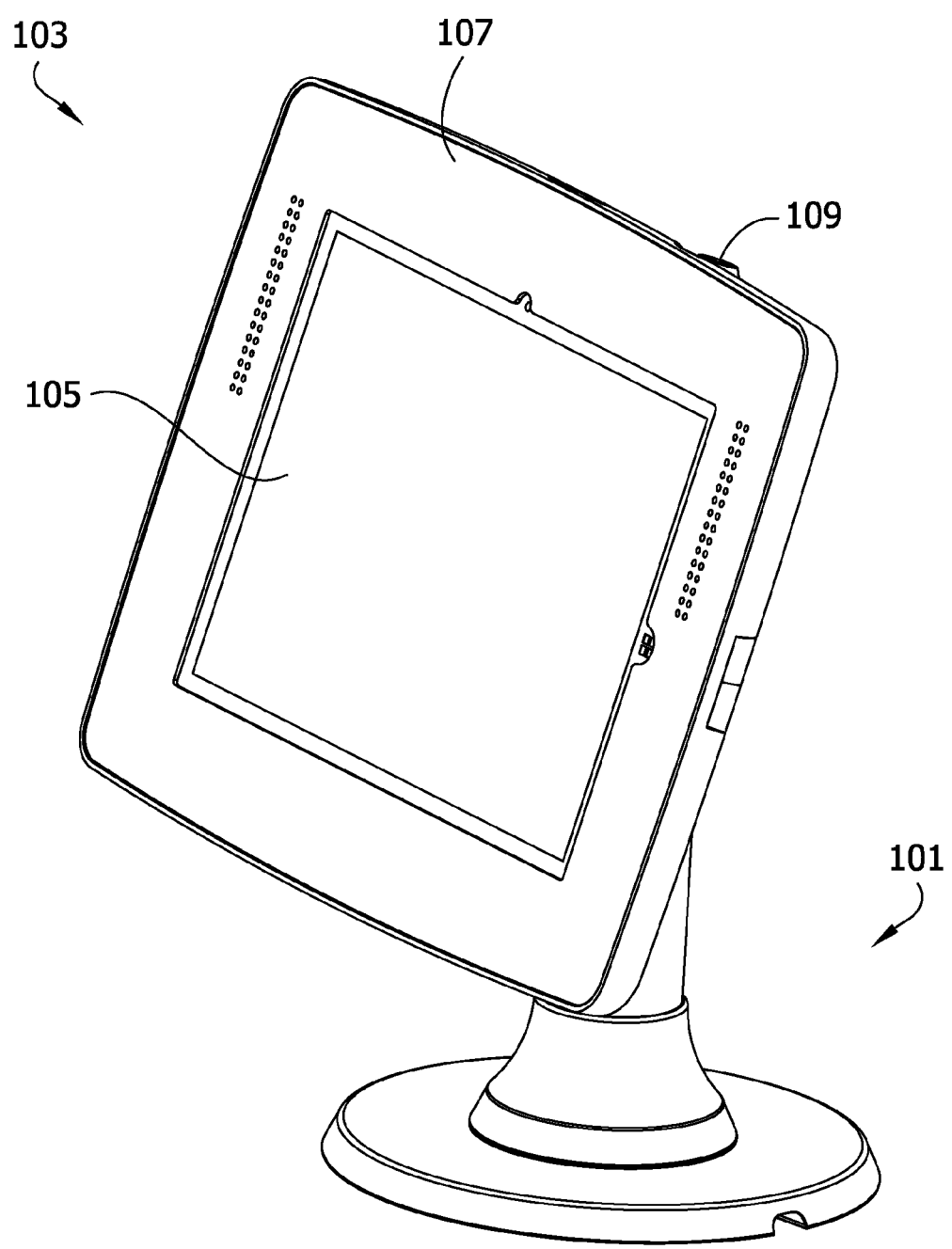
FIG. 1 is a perspective of one embodiment of a secure adjustable mounting system of the present invention in combination with an enclosed tablet computer system supported thereby.
Figure 2:
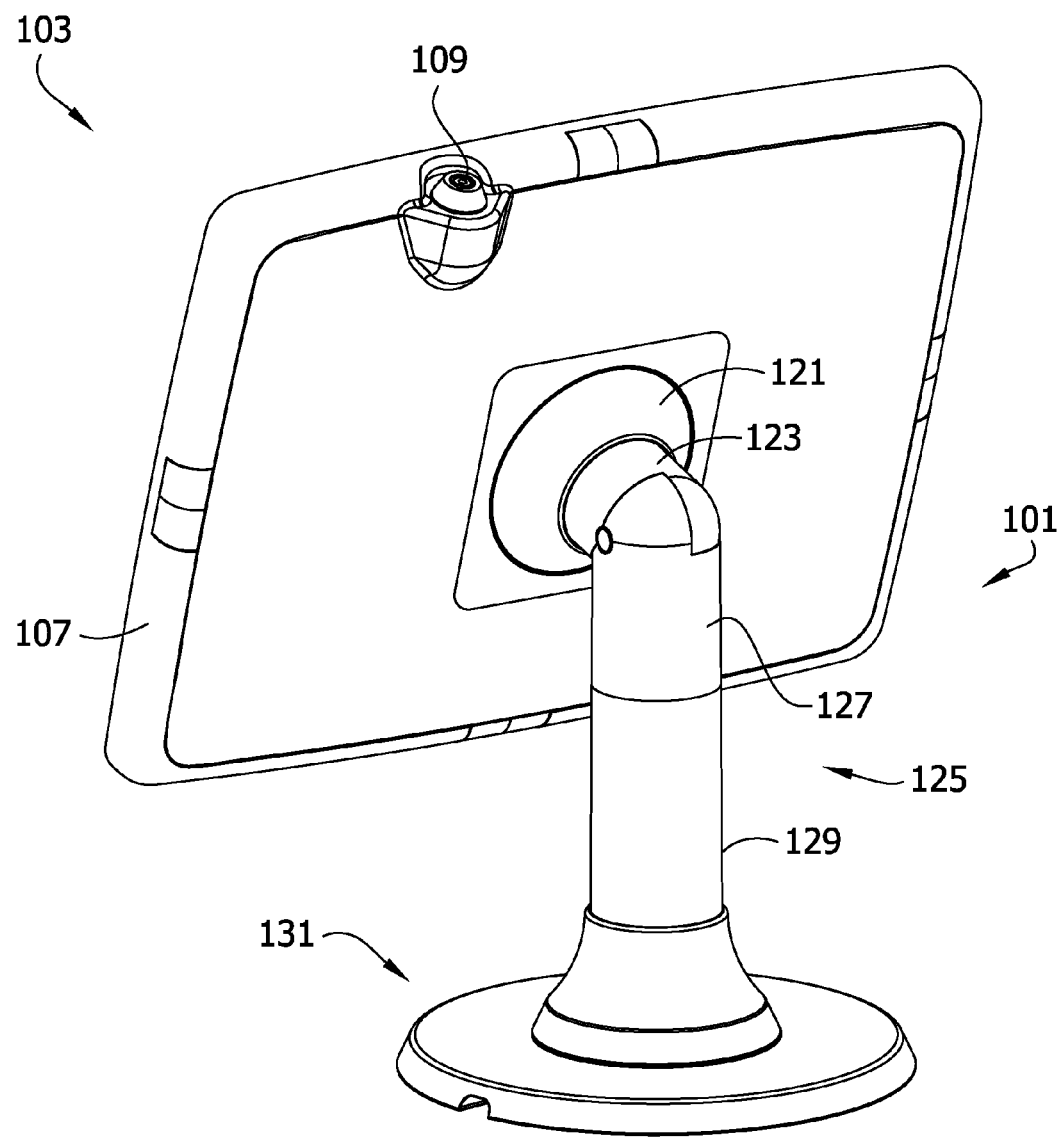
FIG. 2 is a another perspective of the secure adjustable mounting system and tablet computer system illustrated in FIG. 1 from a different vantage point.

Referring now to the drawings, one embodiment of a secure adjustable mounting system is generally designated 101. In FIGS. 1 and 2, the system 101 is illustrated in combination with a tablet computer system 103, such as the tablet computer system disclosed in commonly owned U.S. patent application Ser. No. 15/015,515, file Feb. 4, 2016, entitled "TABLET COMPUTER SYSTEM," inventor John T. Weldon, the entire contents of which are hereby incorporated by reference. In general, the tablet computer system 103 includes a tablet computer having a touchscreen 105. One or more peripheral devices (not shown) may be connected to the tablet computer. The tablet computer and any peripherals are enclosed, or at least partially enclosed, in an enclosure 107. A lock 109 prevents unauthorized opening of the enclosure 107 and limits access to the tablet computer and any peripherals attached thereto.

Figure 3:
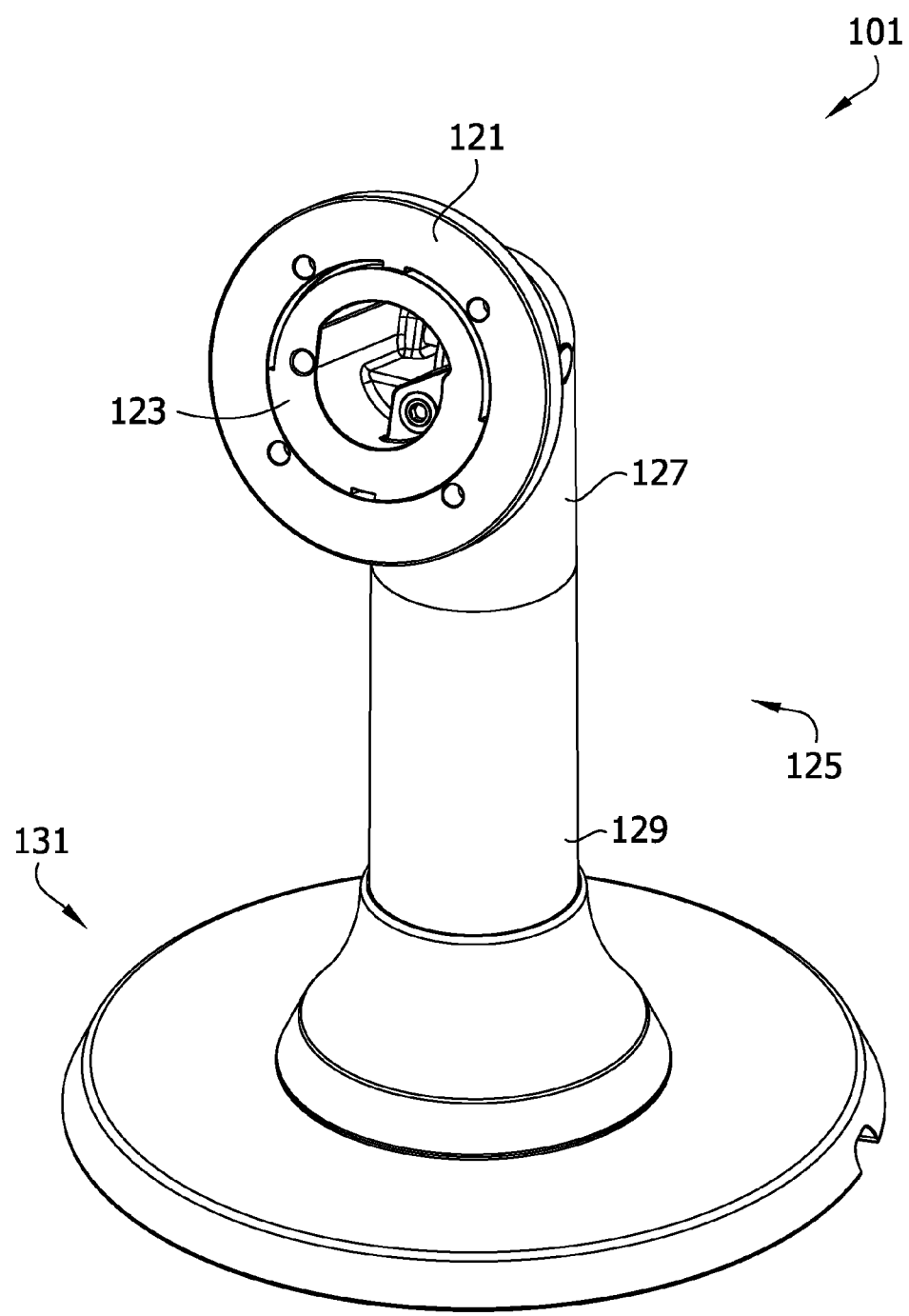
FIG. 3 is a perspective of the secure adjustable mounting system of FIGS. 1 and 2 illustrated without the tablet computer system.
Figure 4:
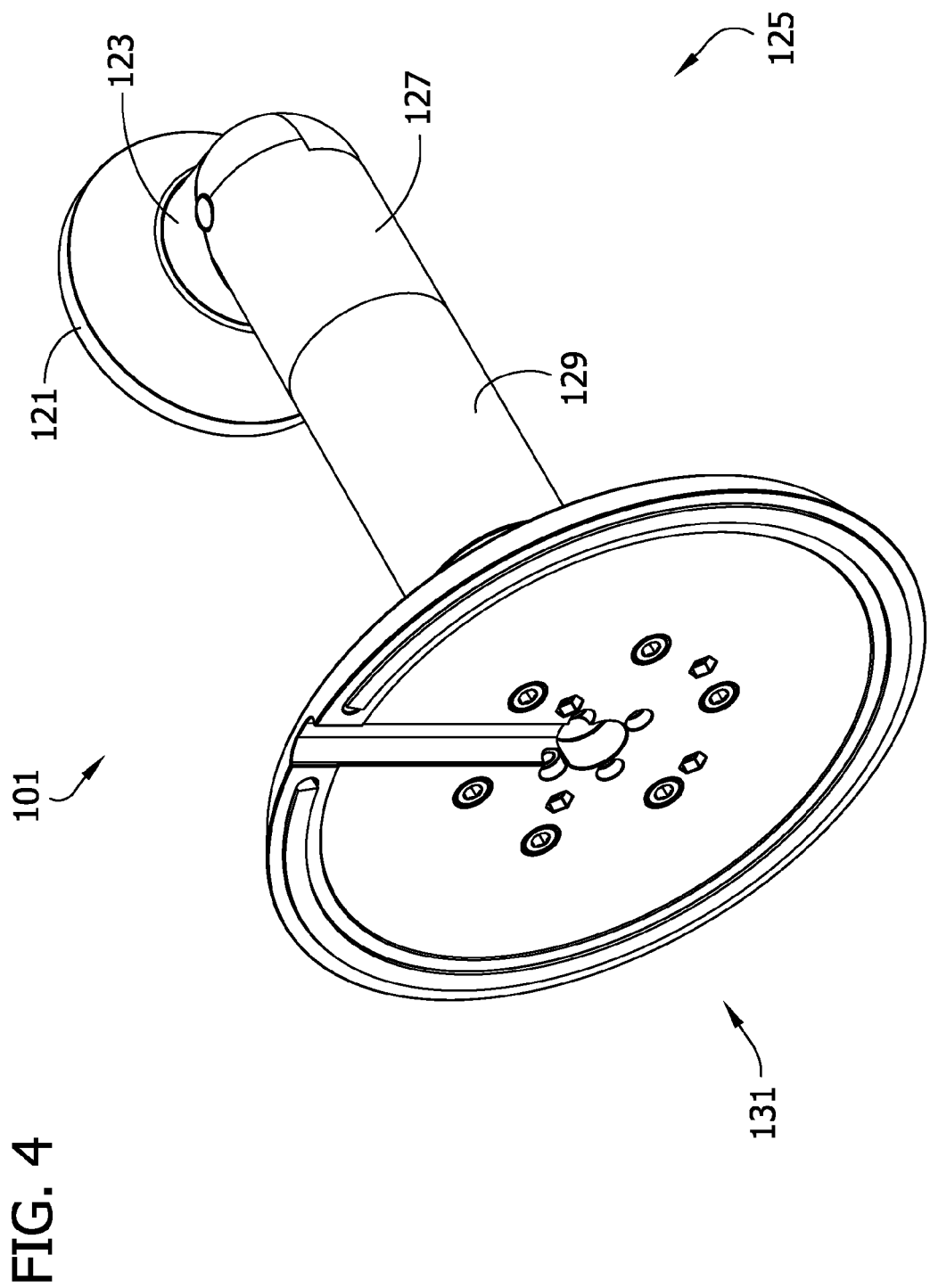
FIG. 4 is another perspective of the secure adjustable mounting system of FIG. 3 from a different vantage point.
Figure 5:
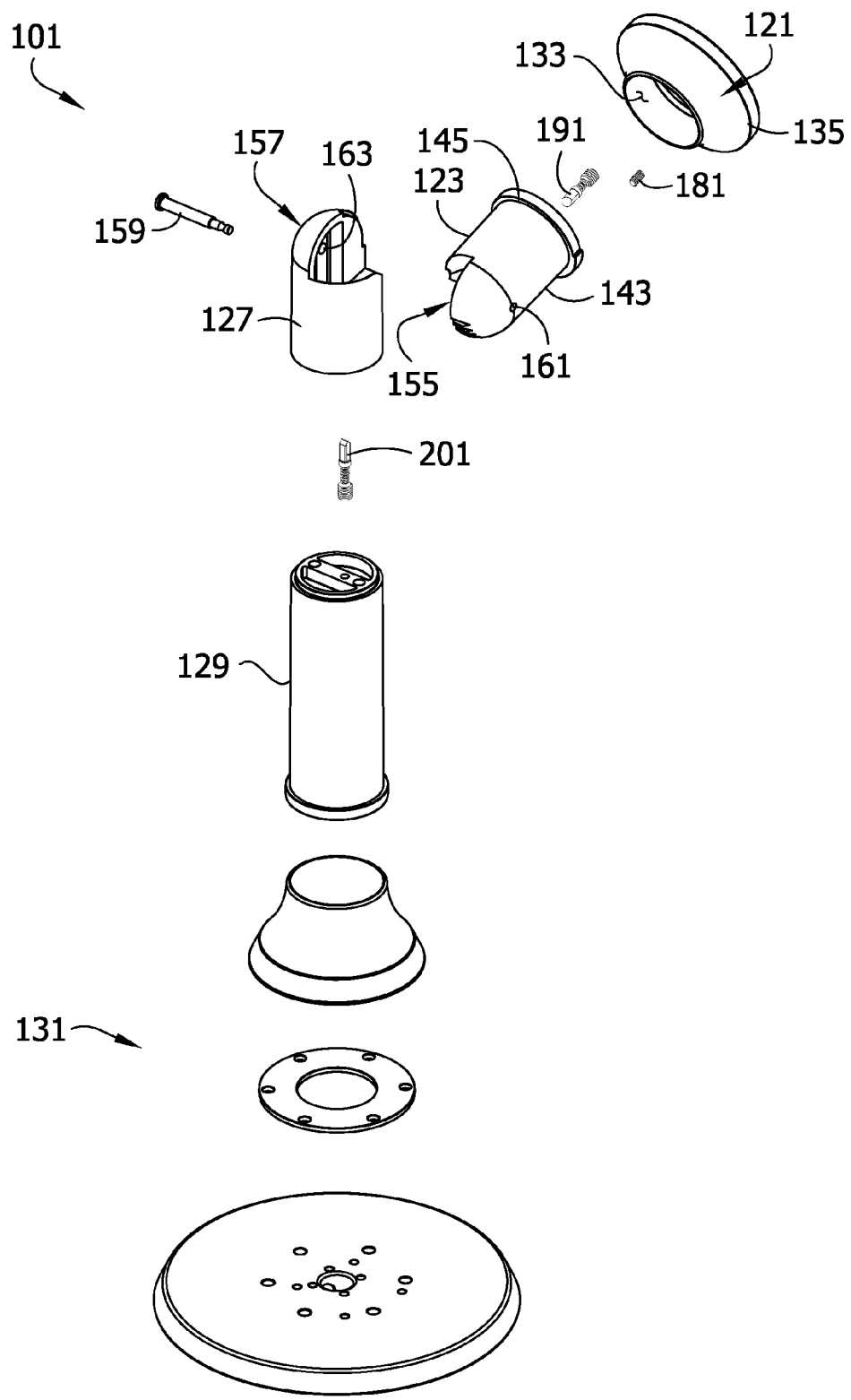
FIG. 5 is a perspective of various parts of the secure adjustable mounting system of FIGS. 3 and 4 in an exploded state.

Referring to FIGS. 3-5, the adjustable mounting system 101 includes a mounting ring 121 for interfacing with the tablet computer system 103 and securing the tablet computer system to the mounting system. The adjustable mounting system 101 also includes a tilt head 123 mounted on a post 125 supported by a base 131. The mounting ring 121 is suitably mounted at the end of the tilt head 123. In the illustrated embodiment, the post 125 includes an upper portion 127 that is designed to interface with the tilt head 123 in a manner that will be described in more detail below. The post 125 also includes a lower portion 129 positioned to extend from the bottom of the upper portion 127 of the post to the base 131. The lower portion 129 can be exchanged with other lower portions (not shown) having any of various different lengths to adjust the height at which the mounting system 101 supports the tablet computer system 103 above the base 131. A hollow space 119 suitably extends all the way through the system from the mounting ring 121 through the base 131 for wiring that may be used to connect the tablet computer system 103 to other external systems (not shown). Furthermore, the system 101 is designed so the opening 119 and any wiring therein is not exposed or readily accessible from outside the system 101, even at the several articulating portions of the system that will be described below.

Figure 6:
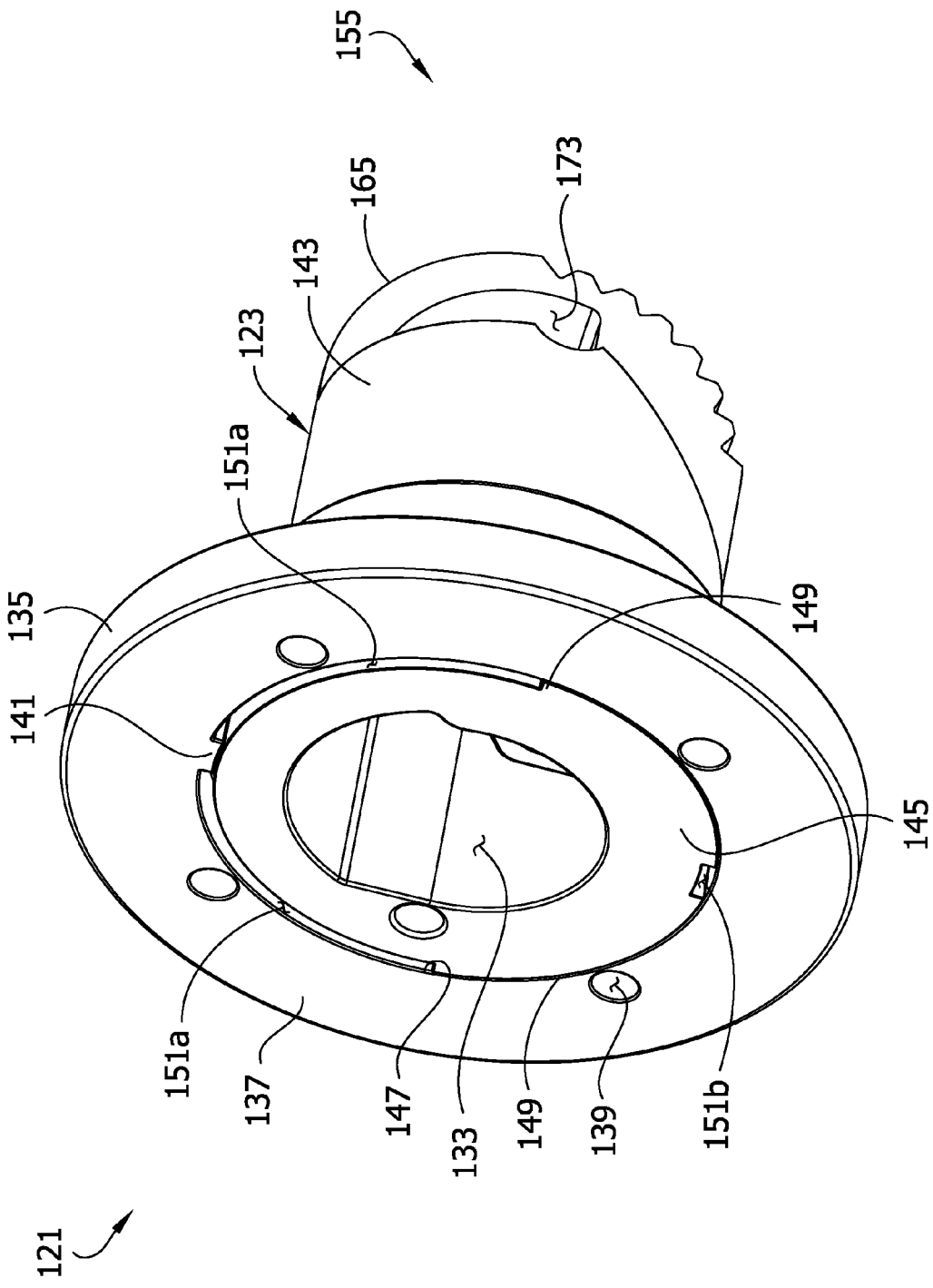
FIG. 6 is an enlarged perspective showing the connection of one embodiment of a mounting ring to one embodiment of a tilt head of the system illustrated in FIGS. 1-5.

The first articulation allowed by the system 101 is a rotation of the mounting ring (and any tablet computer system 103) relative to the tilt head 123 and post 125. Referring to FIGS. 5 and 6, the mounting ring 121 suitably has an opening 133 extending all the way through the mounting ring. The opening 133 suitably has a substantially circular cross sectional shape, as illustrated. The mounting ring also has flange 135 extending radially outward from the opening 133. The flange 135 is suitably substantially annular in shape with a substantially circular outer perimeter. The flange 135 has a substantially flat annular surface 137 (e.g., having a substantially circular outer perimeter) at one end of the mounting ring 121 for mating with a corresponding surface (not shown) on the back of the tablet computer system 103. A plurality of openings 139 are spaced annularly in the flange 135 around the opening 133 to facilitate use of any of any of various fasteners, such as screws or bolts, (not shown) to secure the tablet computer system 103 to the mounting ring 121.

Still referring primarily to FIGS. 5 and 6, the tilt head 123 has a hollow midsection 143 sized and shaped to fit within the opening 133 of the mounting ring. For example, in the illustrated embodiment, the mid-section of the tilt head 123 has an outer surface having a substantially cylindrical shape that generally matches the shape of the circular opening 133 in the mounting ring. The distal end of the tilt head 123 has a radially extending flange 145 positioned to be received in a corresponding shoulder 147 formed in the end of the mounting ring 121 (see FIGS. 10 and 11). An O-ring 148 is suitably positioned between the flange 145 and the shoulder 147 to provide frictional resistance to rotation of the mounting ring 121 relative to the tilt head 123. As seen in FIG. 6, the mounting ring 121 has a positioning tab 141 extending radially inward from the flange 135 toward the center of the opening 133. The flange 145 of the tilt head 123 includes one or more stops 149 positioned to limit rotation of the mounting ring 121 relative to the tilt head 123. For example, in FIG. 6 the tilt head 123 has two stops 149. Each stop 149 is suitably an arcuate extension of the flange 145 extending radially outward along a limited segment of the perimeter of the flange. The areas between the stops 149 define slots 151, in combination with the inner edge of the annular shoulder 147 at the end of the mounting ring 121, in which the positioning tab 141 of the mounting ring can be received.

One of the slots 151a is substantially longer than the width of the positioning tab 141 and thereby forms a track along which the positioning tab can move as the mounting ring 121 (and any tablet computer 103 that may be mounted thereon) rotates relative to the tilt head 123 in the direction of the arrows on FIG. 6. This longer slot 151a suitably provides a relatively wide range of rotational movement between the mounting ring 121 and the tilt head 123. For example, the slot 151 suitably allows at least about 135 degrees of movement, more suitably at least about 160 degrees of movement, and still more suitably at least about 180 degrees of movement. In the example illustrated in FIG. 6, the slot 151a allows about 180 degrees of movement between the mounting ring 121 and the tilt head 123. The other slot 151b is suitably significantly shorter in length to provide the option to set up the system 101 so there is more restricted movement between the mounting ring 121 and the tilt head 123. For example, in the illustrated embodiment, the length of the shorter slot is about the same as the width of the positioning tab 141. Thus, when the mounting ring 121 is connected to the tilt head so that the positioning tab 141 is received in the shorter slot 151b, the mounting ring 121 is substantially fixed to the tilt head 123 and substantially no rotation is permitted between the mounting ring (and any tablet computer system 103 thereon) and the tilt head.

Accordingly, the mounting ring 121 and tilt head 123 are designed so the owner or other authorized users of the system 101 can elect to configure the system in different ways, including one way (with the positioning tab 141 in the longer slot 151a) that allows a relatively larger range of rotational movement of the mounting ring, and any tablet computer system 103 thereon and another way (with the positioning tab 141 in the shorter slot 151b to allow only a more limited range of rotational movement (e.g., no range of movement) between the mounting ring and the tilt head. If desired, the mounting ring and tilt head can be designed to prevent any relative rotation between these parts without departing from the broad scope of the invention. Once the tablet computer system 103 is mounted on the mounting ring 121, there will be no outward indication how to reconfigure the system 101 to change how much the tablet computer and mounting ring can be rotated. This deters the public and other unauthorized people from tampering with the rotational adjustment of the mounting ring 121 (and any tablet computer system 103 thereon) relative to the tilt head 123.

A second articulation that may be allowed by the system 101 is a tilting of the tilt head 123 (and any tablet computer system 103 mounted on the system) relative to the post 125. Referring now to FIGS. 5-8, the end of the tilt head 123 opposite the flange 145 has a formation 155 shaped and configured to interface with a corresponding pivot formation (FIGS. 5, 7, and 8) on the post 125 to pivotally mount the tilt head on the post. The formations 155, 157 can take different forms within the scope of the invention. For example, in the illustrated embodiment, the formations 155, 157 are designed to allow pivoting movement between the tilt head 123 and the post 125 on a single horizontal axis defined by a pivot shaft 159 (FIGS. 5, 7, and 8) that extends through corresponding openings 161, 163 in the tilt head 123 and the upper leg 127 of the post 125. However, it is not required that the tilt head be pivotable relative to the post within the broad scope of the invention, in which case the tilt head could be considered simply a head.

Figure 7:
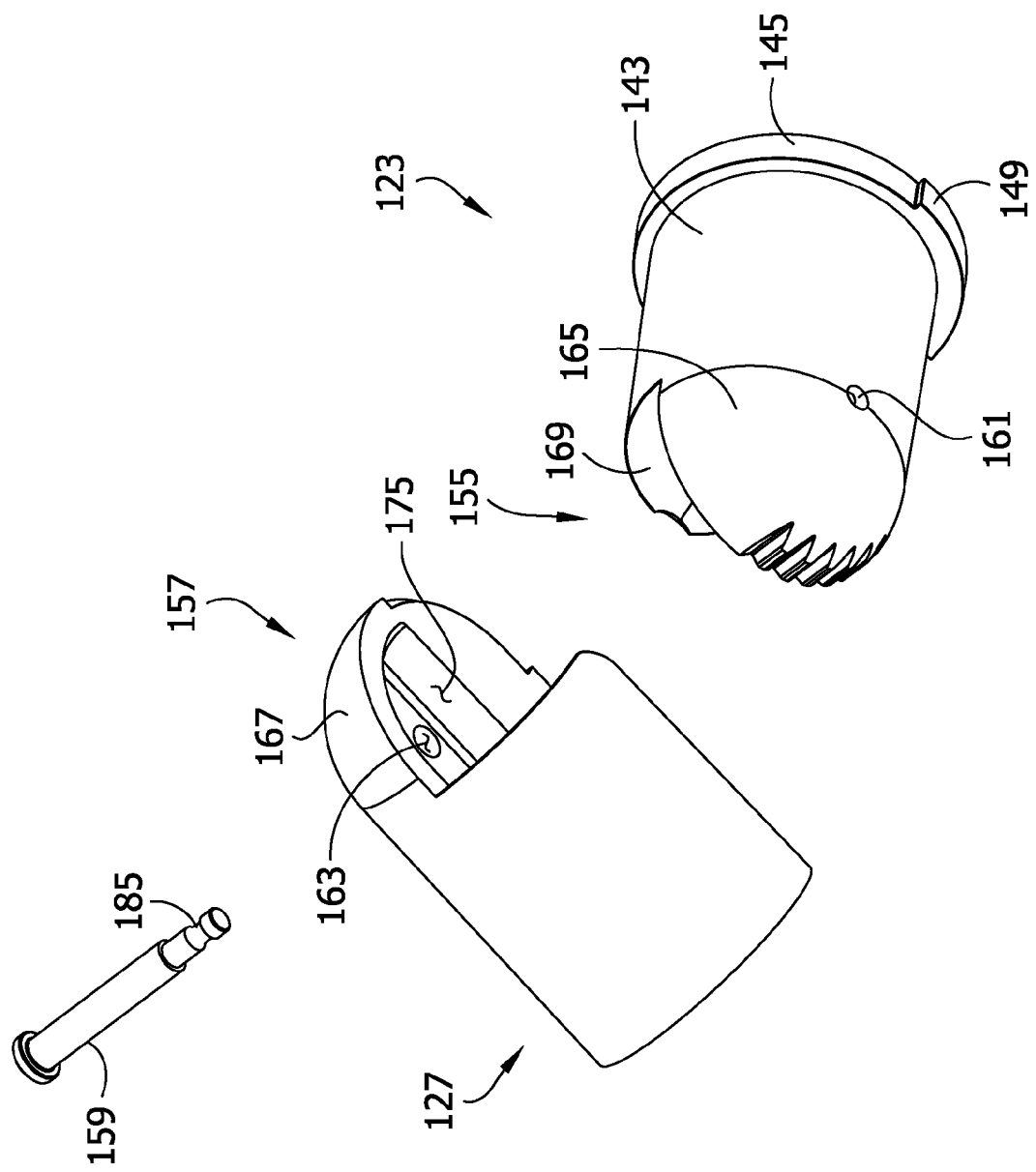
FIG. 7 is an enlarged perspective showing the tilt head illustrated in FIG. 6 and one embodiment of an upper post portion in an exploded state.
Figure 8:
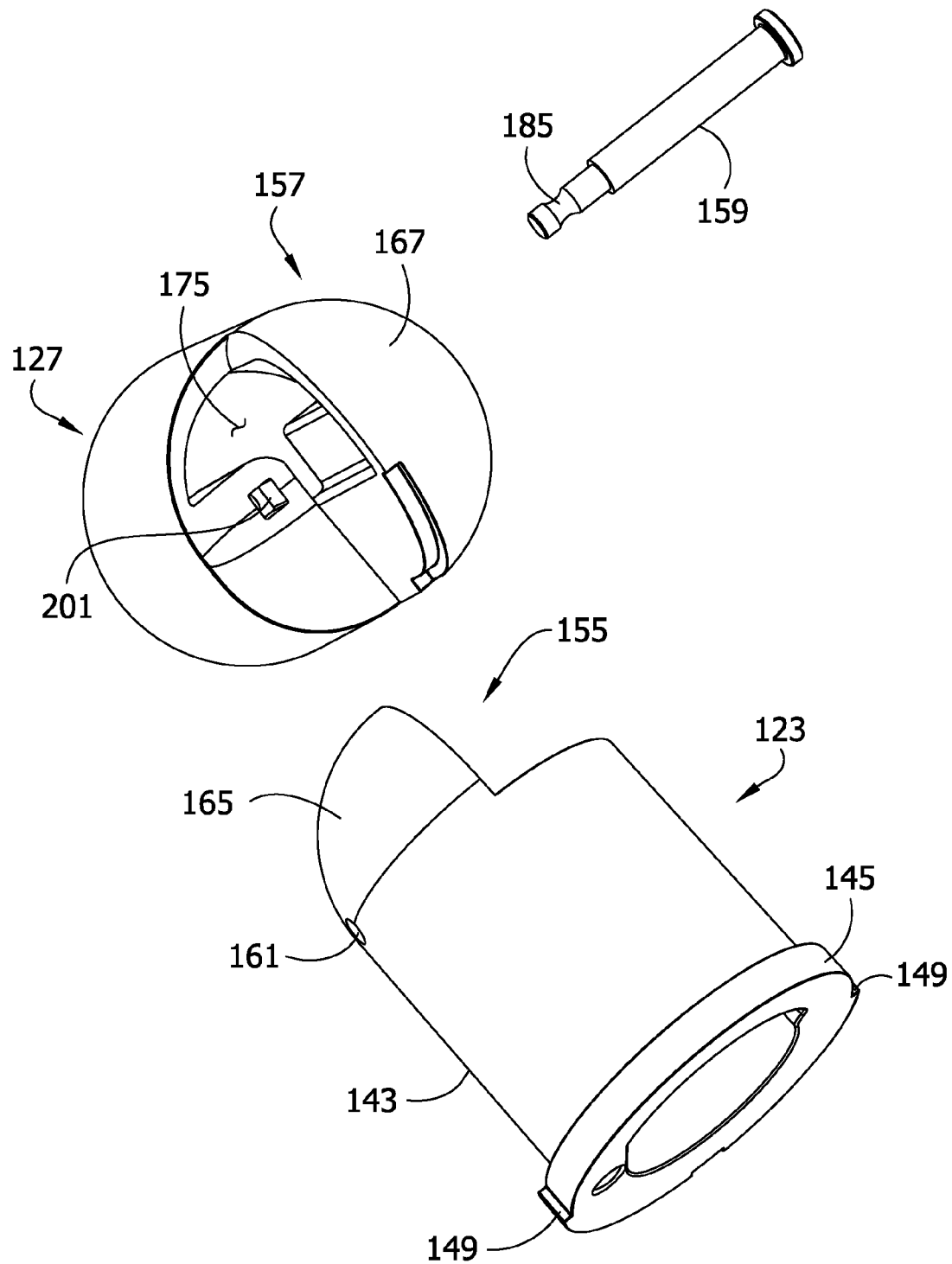
FIG. 8 is an enlarged perspective similar to FIG. 7 but taken from a different vantage point.

As illustrated in FIGS. 5, 7, and 8, the joint between the tilt head 123 and upper leg 127 of the post 125 is suitably a modified ball and socket joint. In contrast to a conventional ball and socket joint in which one member connected at the joint has a ball formation on its end and other member connected at the joint has a socket for receiving the ball formation, one portion of a ball formation 165 is on the tilt head 123 and another portion of the ball formation 167 is on the upper leg 127 of the post 125. For example, in the illustrated embodiment the ball formations 165, 167 are each a hollow shell in the shape of a about half of a hemisphere. Also, a portion of a socket formation 169 is on the tilt head 123 while another portion of the socket formation 171 is on the upper leg 127 of the post 125. Each of the socket formations 169, 171 is suitably a concave surface sized and shaped to generally conform to the corresponding ball formation 165, 167. The tilt head 123 and the upper leg 127 of the post 125 are configured so that when the pivot shaft 159 is inserted through the openings 161, 163, the pivot shaft holds the formations 155, 157 so that the ball formation 165 on the tilt head 123 is received in the socket formation 171 on the post 125 and the ball formation 167 on the post is received in the socket formation 169 on the tilt head. When the tilt head and ball joint are connected in this manner, an opening 173 in the end of the tilt head 123 is aligned with an opening 175 in the upper leg 127 of the post 125. These openings 173, 175 form part of the passage 119 through the system 101 for wiring.

Figure 12:
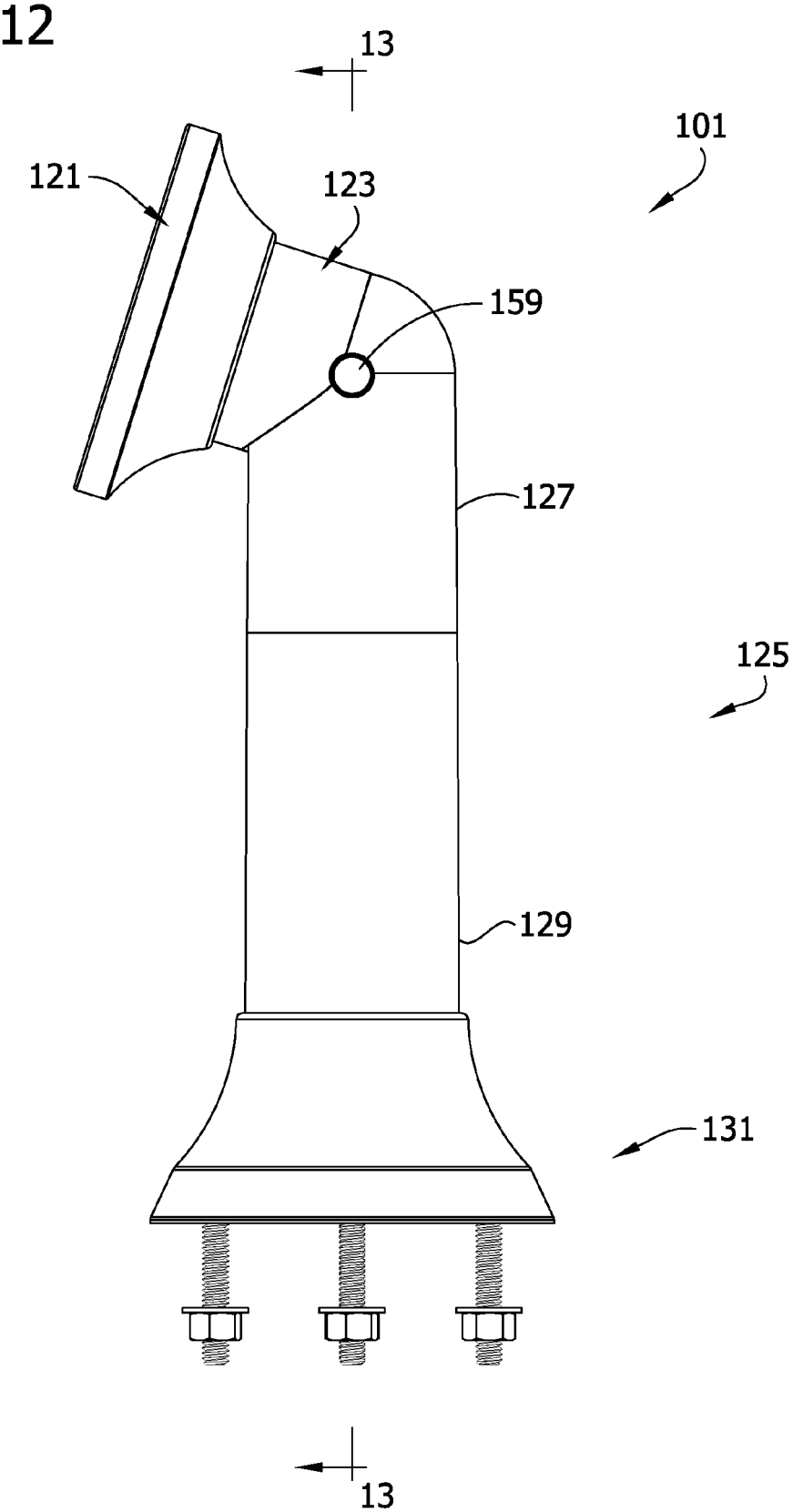
FIG. 12 is a side elevation of the mounting system illustrated in FIGS. 1-5 illustrating a range of adjustability of a tilt mechanism thereof.

The range of motion of the tilt head 123 relative to the post 125 can vary within the scope of the invention. Referring to FIG. 12 for example, in the illustrated embodiment the tilt head 123 can be tilted anywhere relative to the post 125 within a range of at least about 60 degrees, and more suitably at least about 70 degrees, and still more suitably at least about 78 degrees. The tilt head 123 and post 125 are suitably designed so the tilt head can be adjusted to hold the tablet computer in a substantially horizontal position. In the embodiment illustrated in FIG. 12, for example, the tilt head 123 can be positioned at any angle ranging from about 12 degrees relative to a horizontal reference plane to substantially vertical (i.e., about 90 degrees relative to the horizontal reference plane).

The system 101 includes several different ways that owners and other authorized personnel can adjust the pivot angle of the tilt head relative to the upper leg 127 of the post 125. The first way involves use of a set screw 181. The second way involves use of a spring loaded pressure pad 191. A third way involves use of a spring loaded index pin 201. Each of these options will be discussed in detail below.

Figure 9:
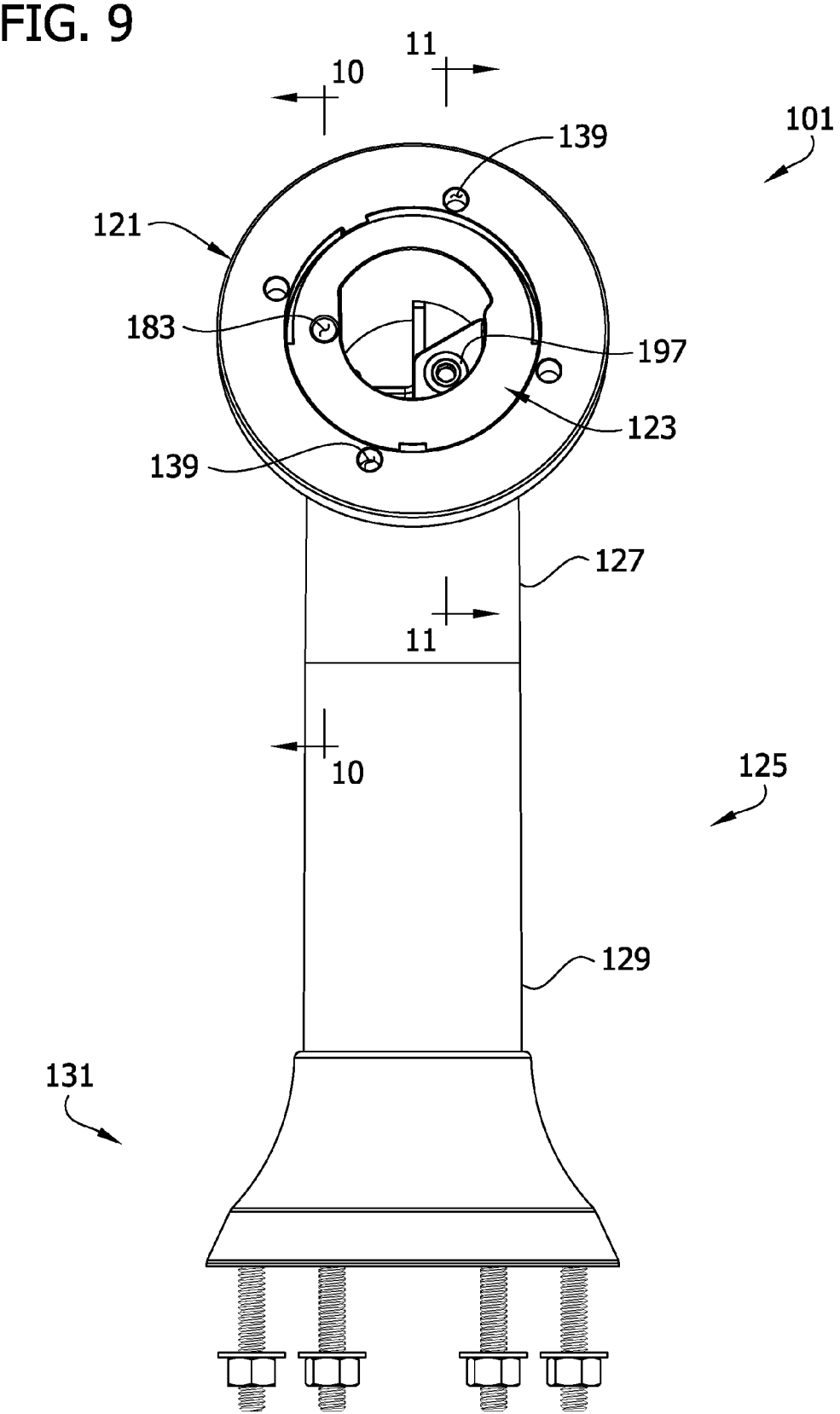
FIG. 9 is a front elevation of components of the mounting system illustrated in FIGS. 1-5.
Figure 10:
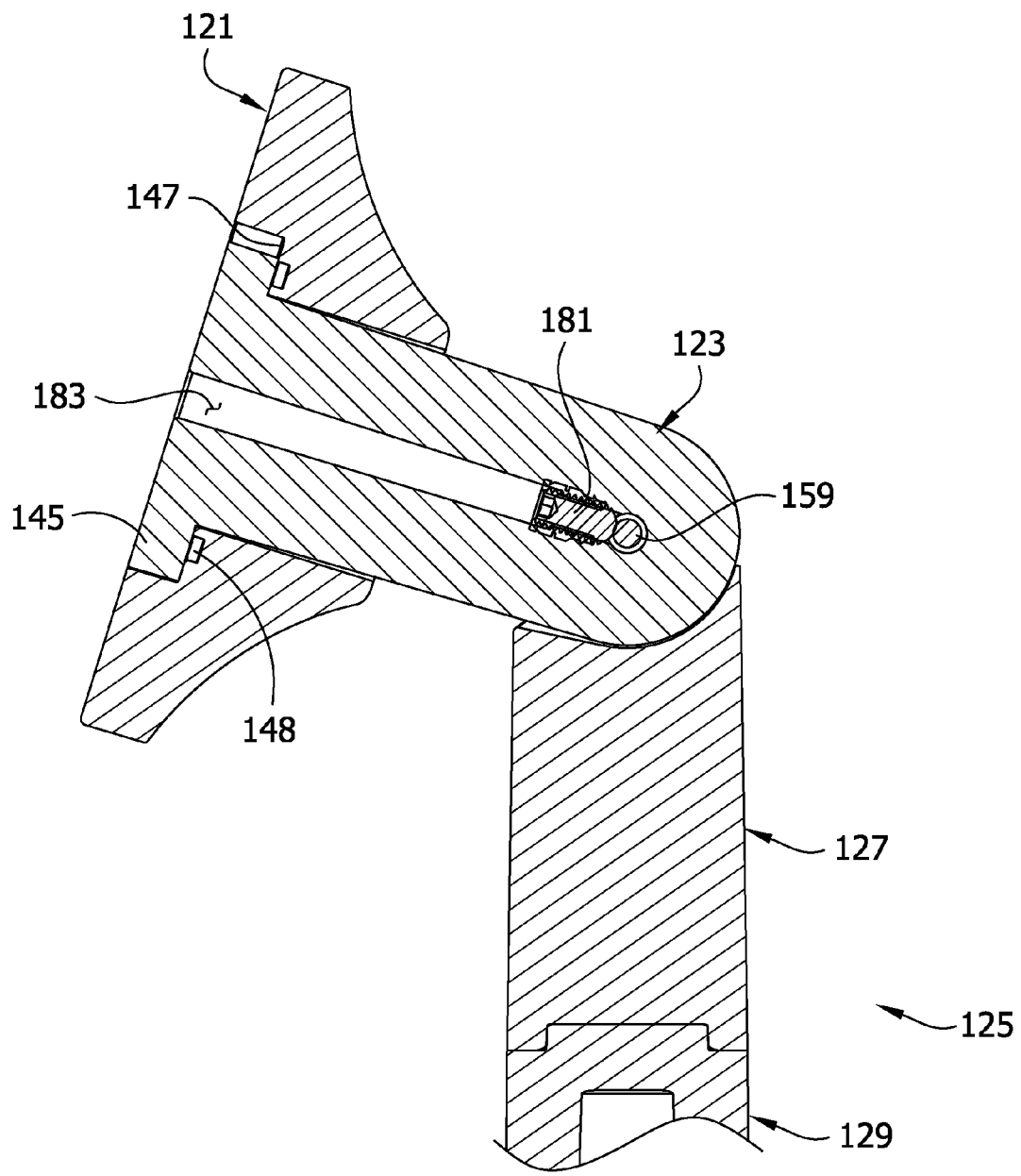
FIG. 10 is a cross section of components mounting system illustrated in FIGS. 1-5 and 9 taken in a line included line 10-10 on FIG. 9 showing one embodiment of a set screw that can be used to fix the orientation of the tilt head relative to the upper post portion.

Referring to FIGS. 5, 9 and 10, a set screw 181 extends through an opening 183 in the tilt head 123 to a position where the set screw can engage the pivot shaft 159. A groove 185 in the pivot shaft 159 helps seat the set screw 181 against the pivot shaft. Referring to FIGS. 9 and 10, the opening 183 for the set screw is suitably positioned on the front of the tilt head 123 such that access to the opening is blocked when a tablet computer system 103 is mounted to the mounting ring 121. Thus, if an owner or other authorized person wants to configure the system in a manner that substantially prevents any tilting of the tilt head 123, this can be done by positioning the tilt head 123 at the desired angle and then tightening the set screw 181 against the pivot shaft 159. Alternatively, if desired, the owner or other authorized personnel can back the set screw 181 partially out of the opening 183 (or even remove the set screw entirely) to configure the system 101 so the set screw provides little to no resistance to rotation of the tilt head 123 relative to the post 125. Once the tablet computer system 103 is in place on the mounting ring 121 at the front of the tilt head 123, there is no outward indication of the location of the set screw 181, how to adjust the set screw, or even of the fact that the set screw exists. This discourages tampering with the tilt angle adjustment by the public or other unauthorized personnel.

Figure 11:
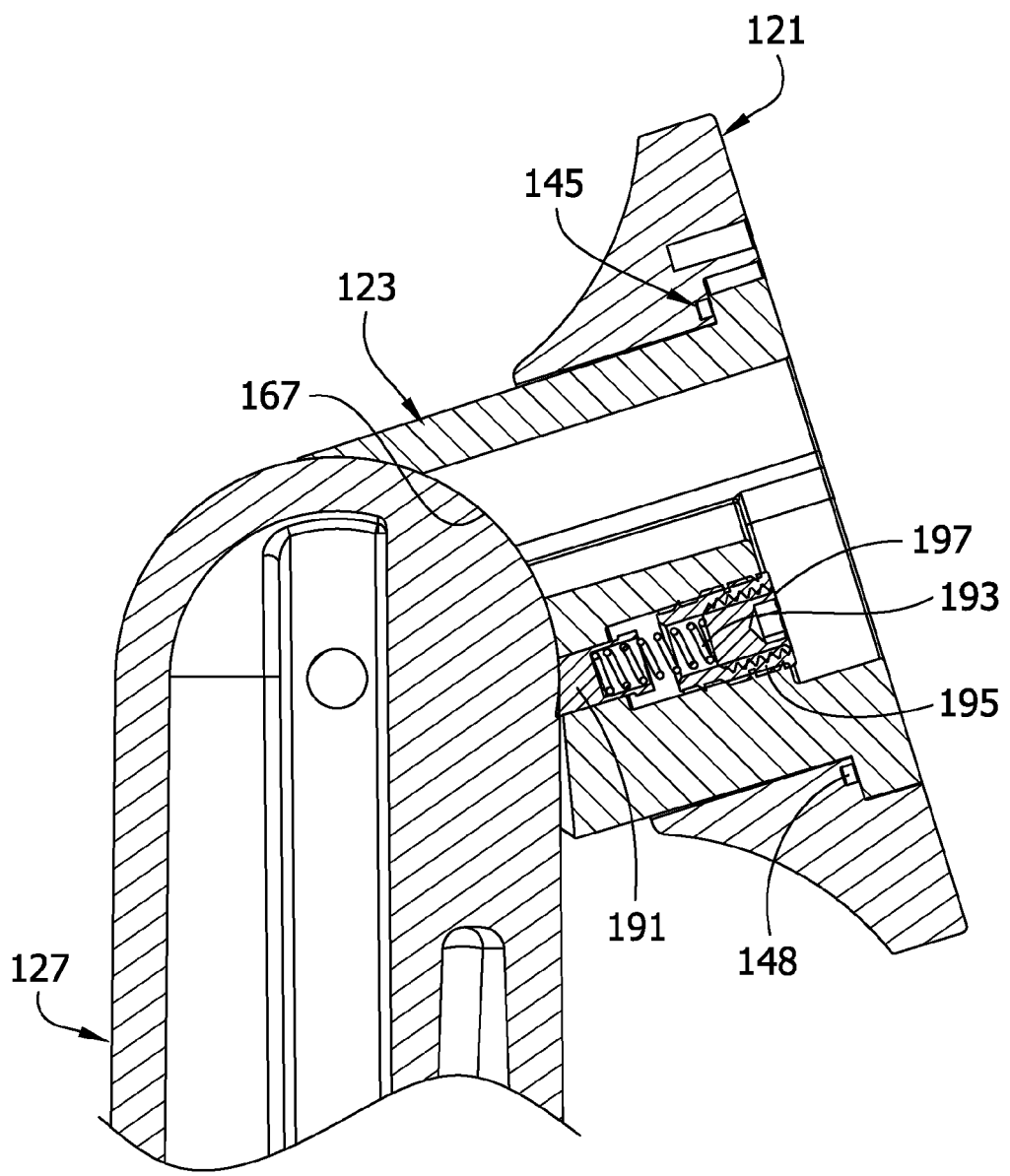
FIG. 11 is a cross section of components mounting system illustrated in FIGS. 1-5 and 9 taken in a line included line 11-11 on FIG. 9 showing one embodiment of a pressure pad that can be used to adjust the amount of resistance of the tilt head to pivoting movement relative to the upper post portion.

Referring to FIGS. 5, 9, and 11, alternatively, or additionally, the system 101 allows the adjustment to the angle of the tilt head 123 (and any tablet computer system 103 thereon) relative to the post 125 to be regulated by a spring loaded pressure pad 191 that can be positioned to have a frictional engagement with the upper portion of the post 127. For example, the spring loaded pressure pad 191 is suitably positioned to engage the ball formation 167 on the upper portion 127 of the post 125. As illustrated in FIG. 11, the pressure pad 191 is held against the ball formation 167 by a spring 193, which can be advanced or retracted by a threaded positioner 195 received in an opening 197 that is accessible only from the front of the tilt head 123. Thus, amount of friction between the pressure pad 191 and the upper portion 127 of the post 125 can be adjusted by turning the threaded fastener 195 to compress or relax the spring 193. Moreover, if the owner or other authorized personnel desires, the threaded fastener 195 can be backed partially out of the opening 197 to reduce or eliminate frictional resistance between the pressure pad 191 and the upper portion 127 of the post 125. Further, the pressure pad 191, spring 193 and threaded positioner 195 may be removed entirely by the owner or other authorized personnel if there is no desire to use the pressure pad to help hold the tilt head 123 in a desired position. Although the owner and other authorized personnel have several options with respect to the spring loaded pressure pad 191, once the tablet computer system 103 is in place on the mounting ring 121 at the front of the tilt head 123, there is no outward indication of the location of the spring loaded pressure pad 191, how to adjust the amount of friction applied by the pressure pad, or even of the fact that the pressure pad exists. This also helps discourage tampering with the tilt angle adjustment by the public or other unauthorized personnel.

Figure 13:
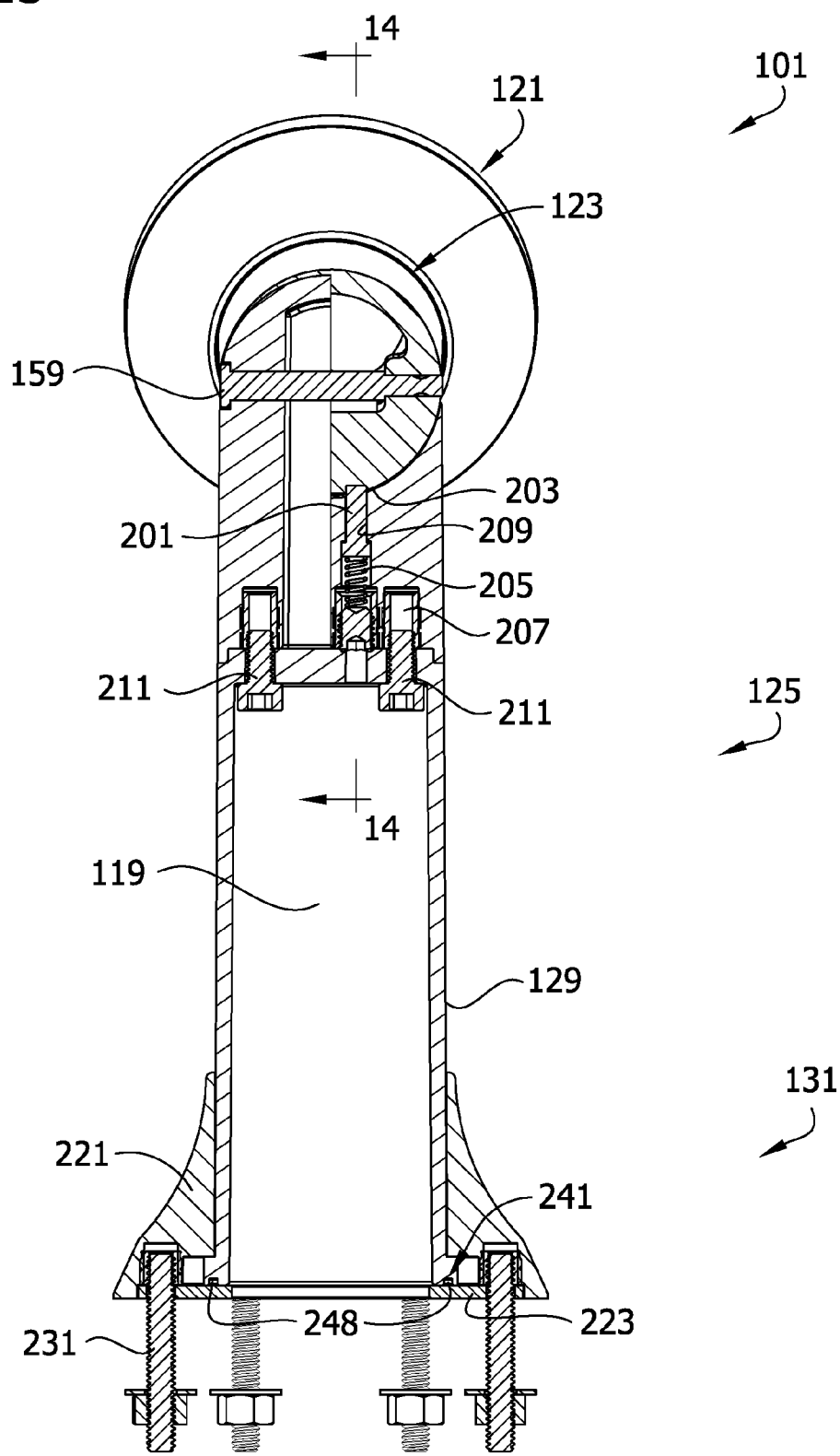
FIG. 13 is a section view taken in a plane including line 13-13 on FIG. 12.
Figure 14:
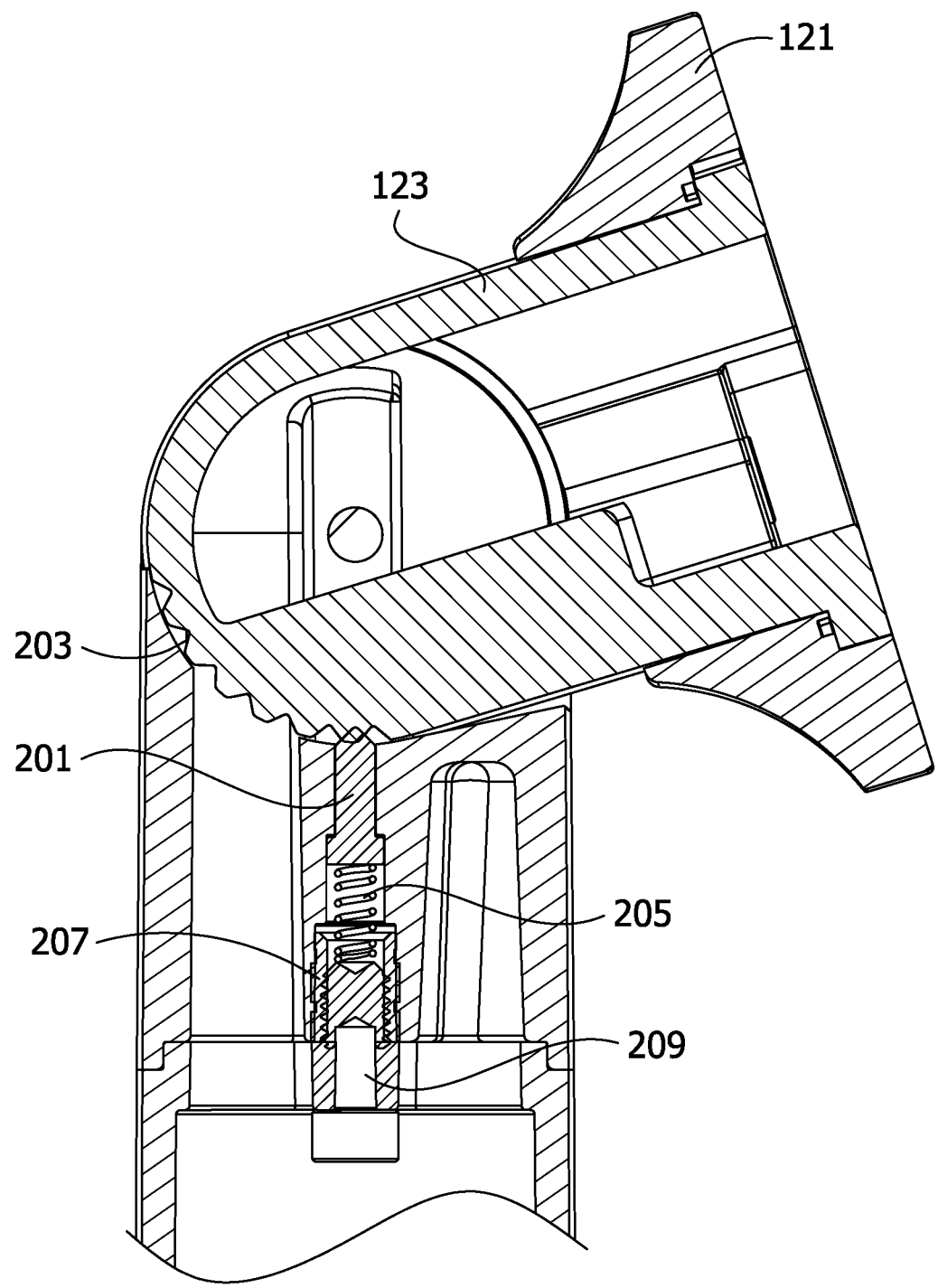
FIG. 14 is a section view taken in a plane including line 14-14 on FIG. 13.

Referring to FIGS. 5 and 12-14, a spring loaded index pin 201 is mounted in the upper portion 127 of the post. The pin 201 is positioned so its distal end engages a series of teeth 203 formed on the tilt head 123. For example, the teeth are suitably formed on the ball formation 165 of the tilt head 123. Referring to FIGS. 6, 7, and 14, the teeth 203 are suitably arranged in a linear series of teeth extending along the inward edge of the ball formation 165 on the tilt head 123 where the ball formation on the tilt head abuts the pivot formation 157 on the upper portion 127 of the post 125. The spring loaded index pin 201 is biased by a spring 205 that is positioned by a threaded positioner 207, all of which are received in an opening 209 accessible from the bottom of the upper portion 127 of the post 125. If desired by an owner or other authorized personnel, the threaded positioner 207 can be positioned to compress the spring 205 and urge the index pin 201 into engagement with the teeth 203. When the tilt head 123 is angled relative to the post 125 so the index pin 201 is in a valley between adjacent teeth 203 the spring 205 moves the distal end of the index pin into the valley. When the index pin 201 is in the valley between adjacent teeth 203 the index pin provides some resistance to rotation of the tile head 123. However, it is possible to rotate the tilt head 123 just by applying a force to the tilt head to drive the index pin 201 out of the valley against the bias of the spring 205. As the tilt head 123 continues to rotate, an adjacent valley between the teeth 203 on the tilt head will be moved into registration with the spring loaded index pin 201, which will then automatically advance into the valley by action of the spring 205. Thus, the spring loaded index pin 201 operates to releasably hold the tilt head 123 at a plurality of different indexed positions. For example, in the illustrated embodiment, the index pin 201 and teeth 203 provide 7 different indexed positions spanning at least about 78 degrees, with the indexed positions being about 13 degrees apart from one another. The number of indexed positions and the number of degrees separating each position can be changed by changing the number and spacing between the teeth that engage the index pin. The owner or other authorized personnel may increase the strength with which the index pin 201 holds the tilt head 123 in the indexed positions by advancing the threaded positioner 207 farther into the opening 209 to compress the spring 205. Alternatively, the owner or other authorized personnel may reduce the strength of the hold at the indexed positions or eliminate the indexing function entirely by partially or fully retracting the threaded positioner 207 from the opening to relax the spring 205 or, if desired, to completely remove the spring and index pin 201. When the post 125 and base 131 are fully assembled, the opening 209 and the threaded positioner 207 therein are not accessible or visible. Thus, there is no outward indication of how to adjust the indexing function. Moreover, at least some parts of the system 101 would need to be disassembled to access the opening 209 for the index pin 201 and make any modifications to the operation of the index pin. This also helps prevent unauthorized tampering with the adjustment settings for the system 101.

Referring to FIG. 13, the upper portion 127 of the post 125 is suitably secured to the lower portion 129 by bolts 211 or other suitably fasteners. In the illustrated embodiment, the upper and lower portions 127, 129 of the post 125 are secured to one another in a way that limits rotation of the upper and lower portions relative to one another. This may be desirable to help control rotation of the post 125 relative to the base 131, as will be described in more detail below. However, this is not required and it is understood that other connections (such as simply threading the upper and lower portions to one another) are possible. One of the primary purposes of the lower post portion 129 is to position the upper post portion 127 at the desired height above the base 131. The use of separate upper and lower post portions is also optional. It is understood that the upper post portion could be made to have the desired length. However, different installations may call for different heights. For example, the system 101 can be used to mount the tablet computer system 103 at a sales counter, in which case a relatively short post, such as the post 125 in the illustrated embodiment, will suffice. On the other hand, the system 101 could instead be used to provide a floor stand for the tablet computer system 103, in which case a longer post 125 would be desirable.

The length of the post 125 of the system can be adjusted by using various different lower post portions having different lengths. The lower post portion 129 in the illustrated embodiment is suitably for use in an installation in which the base is positioned on a countertop. The lower post portion 129 in the illustrated embodiment can be replaced by a different lower post portion (not shown) that is substantially similar to the illustrated lower post portion except that it has a longer length to modify the system 101 for use as a floor stand. The lower post portion 129 is a simpler part to make than the upper post portion 127 due to the relatively complex features associated with the pivot formation 157 on the upper post portion. Thus, from a manufacturing standpoint, it is simpler and more cost effective to make the more complex portion of the post 125 in a relatively small upper portion 127 that can be used in all installations and then use multiple different lower post portions as variable-length extensions that can be used to provide a post having the desired length.

Figure 15:
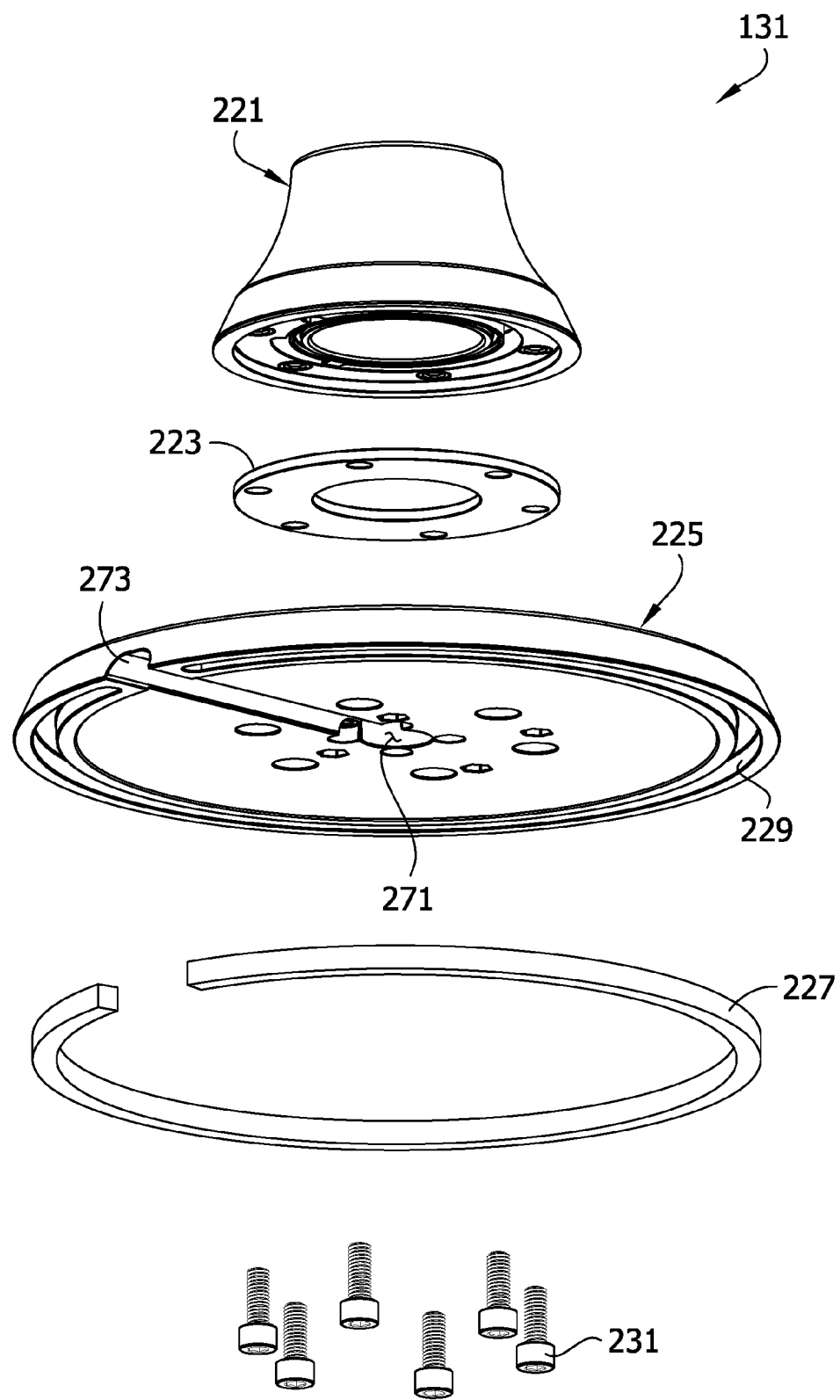
FIG. 15 is a perspective view of one embodiment of base of the system illustrated in FIGS. 1-5 showing the base in an exploded state.
Figure 16:
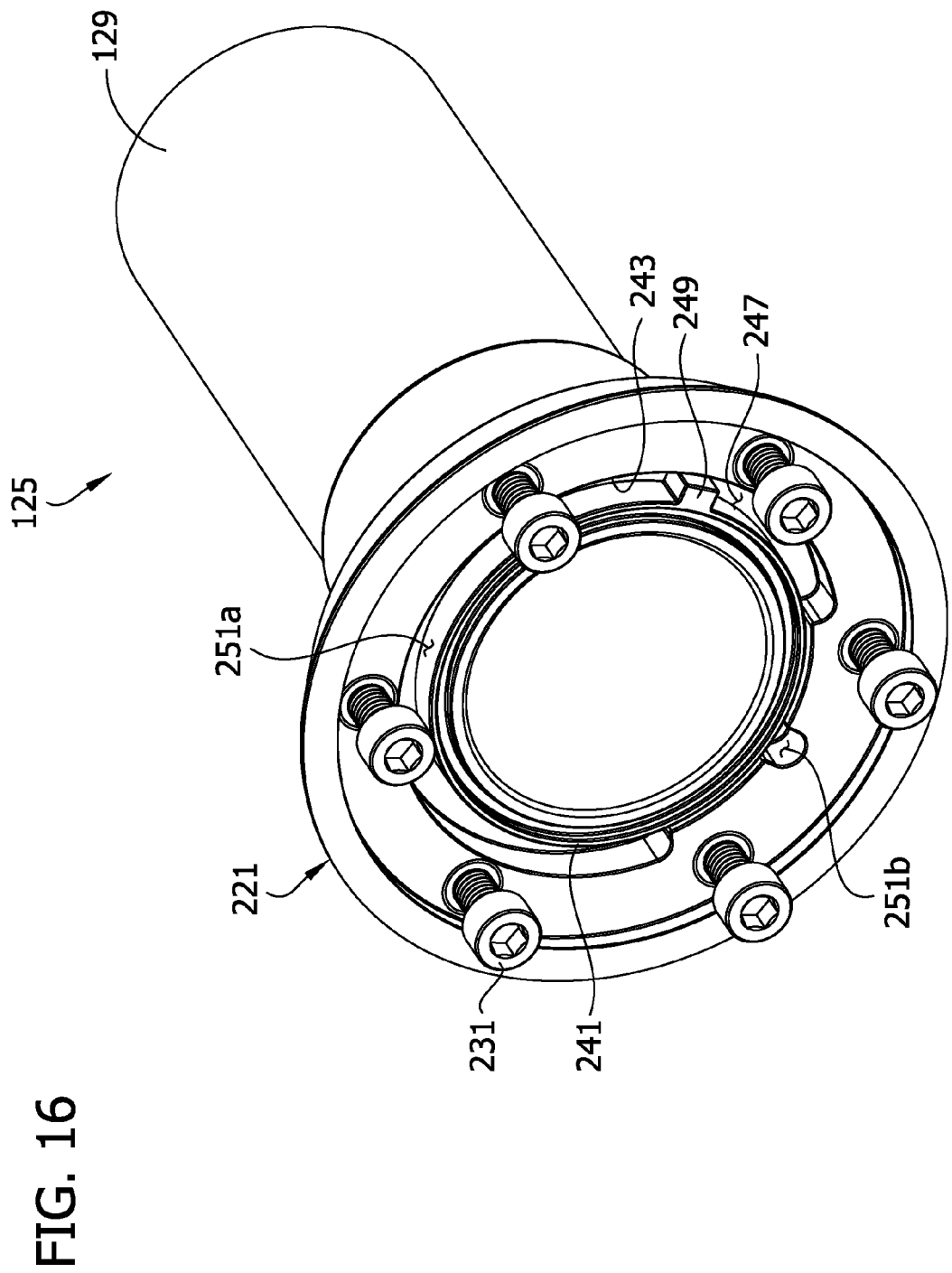
FIG. 16 is an enlarged perspective of portions of the base illustrated in FIG. 15 illustrating components of a system for allowing rotation of a post of the system relative to the base.

Referring to FIG. 15, the base 131 suitably includes a base collar 221 for enclosing various features of the base, an inner base plate 223, and a heavy weighted base portion 225. The base 131 optionally includes a large O-ring 227 mounted in an annular groove 229 in the bottom of the base 131, which may be desirable to help increase frictional resistance to sliding of the base on counter top. The post 125 is suitably secured to the base collar 221. For example, the bottom end of the lower portion 129 of the post 125 suitably has a flange 241 extending radially outward from the post. The base collar 221 suitably has a shoulder 243 for receiving the flange 241 so that the post 125 is retained in connection with the collar by engagement between the flange 241 and the shoulder 243. The shoulder 243 suitably extends farther radially outward than the flange 241 so the is a gap 247 between the outer perimeter of the shoulder and the outer perimeter of the flange. An O-ring 248 is suitably positioned between the post 125 and the inner base plate 223 to provide frictional resistance to rotation of the post relative to the base 131. The post 125 has a positioning tab 249 that extends radially outward from the flange 241 into the gap 247. The collar 221 suitably has one or more stops 245 extending inward into the gap 247. For example, in the embodiment illustrated in FIG. 15, there are two stops 245. Moreover, the stops 245 are suitably positioned so there is a longer angular distance between the stops in a first direction and a comparatively shorter angular distance between the stops in a second direction. Thus, the shoulder 243 and stops 245 are configured to form a relatively long arcuate track 251a in which the positioning tab 249 can move when the post 125 rotates relative to the base 131 and a comparatively shorter track 151b in which the positioning tab 249 may move when the post rotates relative to the base. For example, the long track 251 suitably allows rotation of the post relative to the base through a range of motion of at least about 180 degrees, more suitably at least about 225 degrees, and still more suitably at least about 270 degrees. On the other hand the short track 251b in the illustrated embodiment does not provide any range of motion and therefore can be used when it is desired to fix the rotational position of the post relative to the base.

Accordingly, the post 125 and base 131 are configured so that an owner or other authorized personnel can configure the system 101 in one of two ways. The first way is to assembly the post 125 and base 131 so the positioning tab 249 is in the longer track 251a, which configures the system 101 so that the post (and any tablet computer 103 mounted thereon) can be rotated about a relatively wide range of angles just by grabbing the post and turning it. The other way is to assemble the post 125 and base 131 so the positioning tab 249 is in the shorter track 251b (or completely blocked track, as the case may be) to provide a more limited range of motion (or to prevent all motion) of the post relative to the base. Fasteners 231 extend up through the base 131 to secure the inner base plate 223 to the collar 221 in a manner that encloses the positioning tab 249 within the respective track 251a or 251b. The fasteners 231 also secure the heavy weighted portion 225 of the base 131 to the inner base plate 223 and collar 221. Once the base is fastened together in this manner, there is no outward indication of the way the system 101 can be reconfigured to change the freedom to rotate the post 125 relative to the base 131. This also helps prevent unauthorized tampering with the adjustments of the system 101.

The base 131 can be secured directly to a structure (e.g., floor or counter) that will support the base. The heavily weighted portion 225 of the base 131 can be omitted if desired. Alternatively, the base 131 can be used as a freestanding base, in which case the heavily weighted portion of the base may be desired to provide additional stability to the system 101. The base 131 has a central opening 271, which forms part of the passage 119 extending through the whole system 101 for wiring, through which wiring may be passed. The heavily weighted portion 225 of the base 131 suitably has a channel 273 extending along its bottom surface from the central opening 271 to the edge of the base. It is understood that the wiring is more secure from tampering if the wiring runs directly from the base 131 through the opening 271 therein and into the support structure. However, this may not be feasible in all cases. Thus, the system provides the option to run wiring from the central opening 271 in the base through the channel 273 along the upper surface of the support structure.

In view of the foregoing, it is understood that the system 101 provides owners and other authorized personnel lots of flexibility in how a tablet computer system 103 supported by the system is positioned. In particular, it provides multiple different articulations (e.g., three different articulations in the form of: (i) rotation of the mounting ring and tablet computer 103 about an axis aligned with the tilt head and mounting ring and generally perpendicular to the touchscreen of the tablet computer; (ii) tilting of the tilt head and tablet computer relative to the post 125; and (iii) rotation of the post relative to the base), each of which can be fixed by the owner or authorized personnel if desired. Moreover, none of the adjustment mechanisms are readily accessible to unauthorized personnel because the system 101 must be removed from the support structure (e.g., floor or counter) and/or at least partially disassembled to access the mechanism that control adjustability. Further, any wiring in the passage 119 extending through the system 101 from the mounting ring 121 all the way through the opening 271 in the base 131 is completely enclosed by the parts of the system regardless of how the various components of the system may be positioned relative to one another to adjust the position of the tablet computer. Accordingly, the system 101 provides great flexibility to owners and authorized personnel to configure the system so it has the desired adjustability for specific installations and for users to enjoy the level of adjustability selected by the owners or authorized personnel. At the same time, the system 101 protects owners and authorized personnel from the costs associated with mischievous tampering with the controls on the adjustment mechanisms and limits unauthorized access to any wiring running through the system.

The Abstract and summary are provided to help the reader quickly ascertain the nature of the technical disclosure. They are submitted with the understanding that they will not be used to interpret or limit the scope or meaning of the claims. The summary is provided to introduce a selection of concepts in simplified form that are further described in the Detailed Description. The summary is not intended to identify key features or essential features of the claimed subject matter, nor is it intended to be used as an aid in determining the claimed subject matter.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and methods without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

In view of the above, it will be seen that several advantages of the aspects of the invention are achieved and other advantageous results attained.

Other Statements of the Invention

A secure adjustable mounting system for adjustably holding a tablet computer system in a desired position, the mounting system comprising:

a mount for connecting the mounting system to the tablet computer system;

a head supporting the mount for articulating movement of the mount relative to the head;

a post supporting the head for articulating movement of the head relative to the post;

wherein the mount, head, and post collectively define a passage extending through the mount, head, and post between opposite ends of the passage; and wiring extending through the passage for connecting the tablet computer system to another system through the passage, wherein the wiring is completely concealed between the ends of the passage by the mount, head, and post.

An adjustable mounting system for adjustably holding a tablet computer system in a desired position, the mounting system comprising:

a mount for connecting the mounting system to the tablet computer system;

a head supporting the mount for rotational movement of the head relative to the mount;

a post supporting the head for pivoting movement of the head relative to the post; and a wire in a passage extending through the mount, head, and post, the wire extending between one end of the passage where the mount is configured to interface with the tablet computer and another end of the passage at an end of the post opposite the head, wherein the wire is completely concealed within the passage between said ends of the passage.

An adjustable mounting system for adjustably holding a tablet computer system in a desired position, the mounting system comprising:

a mount for connecting the mounting system to the tablet computer system;

a head supporting the mount for articulating movement of the mount relative to the head;

a post supporting the head for articulating movement of the head relative to the post;

the mounting system having a plurality of different configurations including first and second configurations, the first configuration being a configuration in which the freedom to move the mount relative to the post is limited by a first selectively engageable motion limiter, the second configuration being a configuration in which the freedom to move the mount relative to the post is limited by a second selectively engageable motion limiter different from the first motion limiter, the mounting system being further configured so the first and second selectively engageable motion limiters are not accessible from outside the mounting system when the mount is supported by the head and the head is supported by the post.

What is claimed is:

1. A secure adjustable mounting system for adjustably holding a tablet computer system in a desired position, the mounting system comprising:

a mount for connecting the mounting system to the tablet computer system;

a head supporting the mount for articulating movement of the mount relative to the head;

a post supporting the head for articulating movement of the head relative to the post;

wherein the mount, head, and post collectively define a passage extending through the mount, head, and post between opposite ends of the passage for connecting the tablet computer system to another system via a wiring extending through the passage, the mounting system being configured so the passage is substantially inaccessible from outside the mounting system except at the ends of the passage, the mounting system having a plurality of different configurations including first and second configurations, the first configuration being a configuration in which the freedom to move the mount relative to the post is limited by a first selectively engageable motion limiter, the second configuration being a configuration in which the freedom to move the mount relative to the post is limited by a second selectively engageable motion limiter different from the first motion limiter, the mounting system being further configured so the first and second selectively engageable motion limiters are not accessible from outside the mounting system such that the motion limiters are not visible from outside the mounting system by an end user when the tablet computer system is attached.

2. A secure adjustable mounting system for adjustably holding a tablet computer system in a desired position, the mounting system comprising:

a mount for connecting the mounting system to the tablet computer system;

a head supporting the mount for articulating movement of the mount relative to the head;

a post supporting the head for articulating movement of the head relative to the post;

wherein the mount, head, and post collectively define a passage extending through the mount, head, and post between opposite ends of the passage for connecting the tablet computer system to another system via a wiring extending through the passage, the mounting system being configured so the passage is substantially inaccessible from outside the mounting system except at the ends of the passage when a tablet computer is not attached to the mounting system and the mounting system is not secured to a support, wherein the mount is configured so that an end of the passage adjacent the mount is substantially inaccessible when the mount is connected to a tablet computer such that wiring in the passage adjacent the mount cannot be accessed by an end user.

3. An adjustable mounting system for holding a tablet computer, the mounting system comprising:

a mount for connecting the mounting system to the tablet computer;

a head supporting the mount for rotational movement of the mount relative to the head;

a post supporting the head for pivoting movement of the head relative to the post; and a wire in a passage extending through the mount, head, and post, wherein the head and post are connected to one another by a modified ball and socket formation in which a first partial ball formation is on the head and a second partial ball formation is on the post, the first and second partial ball formations being positioned is side-by-side relation to one another.

4. A mounting system as set forth in claim 1, wherein the mount includes a positioning tab receivable in first and second slots in the mount, the positioning tab being received in the first slot when the mounting system is in the first configuration, and the positioning tab being received in the second slot when the mounting system is in the second configuration.

5. A mounting system as set forth in claim 4, wherein the first slot is longer than the second slot such that the mount is configured to move relative to the post a greater amount in the first configuration than in the second configuration.

6. A mounting system as set forth in claim 5, wherein a length of the first slot is substantially longer than a width of the positioning tab, and a length of the second slot is about the same as the width of the positioning tab.

7. A mounting system as set forth in claim 4, wherein the positioning tab and first and second slots are not visible from outside the mounting system such that they do not provide an indication to the end user of how to reconfigure the mounting system.

8. A mounting system as set forth in claim 1, wherein the post comprises an upper portion and a separate lower portion attached to the upper portion, the upper portion being shorter than the lower portion.

9. A mounting system as set forth in claim 1, further comprising a base supporting the post for articulating movement of the post relative to the base, wherein the post includes a positioning tab positionable in one of first and second tracks formed between the post and the base, wherein freedom to move the post relative to the base is limited by a lesser extent when the positioning tab is in the first track as compared to when the positioning tab is in the second track.

10. A mounting system as set forth in claim 9, wherein the positioning tab and first and second tracks are not visible from outside the mounting system such that they do not provide an indication to the end user of how to reconfigure the mounting system.

11. A mounting system as set forth in claim 9, wherein base has a central opening defining a portion of the passage.

12. A mounting system as set forth in claim 2, wherein the mount includes a positioning tab receivable in first and second slots in the mount, the positioning tab being received in the first slot when the mounting system is in a first configuration, and the positioning tab being received in the second slot when the mounting system is in a second configuration.

13. A mounting system as set forth in claim 12, wherein the positioning tab and first and second slots are not visible from outside the mounting system such that they do not provide an indication to the end user of how to reconfigure the mounting system.

14. A mounting system as set forth in claim 2, further comprising a base supporting the post for articulating movement of the post relative to the base, wherein the post includes a positioning tab positionable in one of first and second tracks formed between the post and the base, wherein freedom to move the post relative to the base is limited by a lesser extent when the positioning tab is in the first track as compared to when the positioning tab is in the second track.

15. A mounting system as set forth in claim 14, wherein the base has a central opening defining a portion of the passage.

16. A mounting system as set forth in claim 3, wherein each of the first and second partial ball formations comprise a hollow hemispherical shell.

17. A mounting system as set forth in claim 16, wherein a first socket formation is on the head and a second socket formation is on the post.

18. A mounting system as set forth in claim 17, wherein each of the first and second socket formations have a concave surface configured to conform to a corresponding partial ball formation.

19. A mounting system as set forth in claim 17, wherein the post comprises an upper portion and a separate lower portion attached to the upper portion, the upper portion being shorter than the lower portion.

20. A mounting system as set forth in claim 3, wherein pivotable movement of the head relative to the post is facilitated by one of a set screw, a spring loaded pressure pad, and a spring loaded index pin.

* * * * *